United States Patent [19]

Jagoda et al.

[11] 4,185,205

[45] Jan. 22, 1980

[54] REMOTE LOAD CONTROLLER

[75] Inventors: Neil H. Jagoda, Framingham; John S. Ballas, Newton; Klaus Kubierschky, North Reading, all of Mass.

[73] Assignee: American Science & Engineering, Inc., Cambridge, Mass.

[21] Appl. No.: 904,341

[22] Filed: May 9, 1978

[51] Int. Cl.² .............................................. H04B 3/54
[52] U.S. Cl. .................................... 307/38; 307/140; 340/310 R; 340/147 G; 307/293
[58] Field of Search ............... 307/140, 34, 35, 38-40, 307/130, 293; 340/147 R, 147 G, 167 R, 168 B, 310 A, 310 R; 361/170, 171, 194, 195, 203

[56] References Cited

U.S. PATENT DOCUMENTS 3,475,619  10/1969  Campbell ............................. 307/40

Primary Examiner—L. T. Hix
Assistant Examiner—S. D. Schreyer
Attorney, Agent, or Firm—Pollock, Vande Sande & Priddy

[57] ABSTRACT

A remote load controlling apparatus receives a disconnect signal on a line that is filtered and voltage limited. This disconnect signal sets a flip-flop which enables an oscillator and a solid-state switch. The enabled switch energizes a relay to disconnect the load from electric service. A counter counts the output of the enabled oscillator and provides a flip-flop reset signal after a local time delay that is determined by a particular incremented count state of the counter. The reset flip-flop disables the oscillator and solid-state switch to de-energize the relay and reconnect the load to electric service. The flip-flop may also be reset by a remote signal to disable the oscillator and solid-state switch and reconnect the load before the counter is incremented to its particular incremented count state. A second counter and a second solid-state switch may be added to ensure that the load is connected to electric service if a component of the apparatus should fail. The second solid-state switch is enabled by the pulse output of the enabled oscillator and is disabled when the oscillator stops generating pulses. The second solid-state switch is connected in series to the first solid-state switch and the relay is energized only when both solid-state switches are enabled. The second counter is provided to enable the oscillator on the leading edge of the disconnect signal and disable the oscillator after a time delay.

25 Claims, 6 Drawing Figures

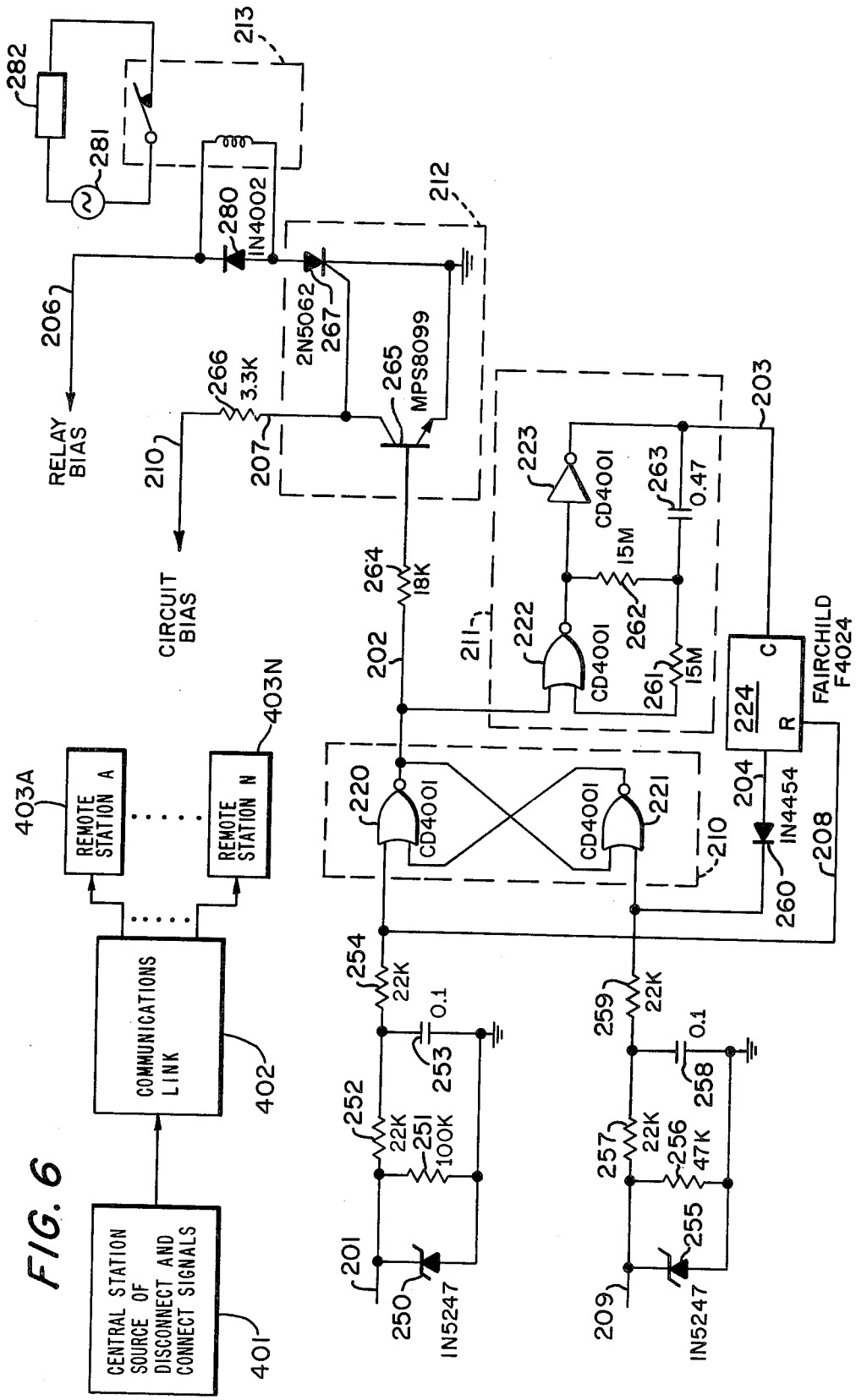

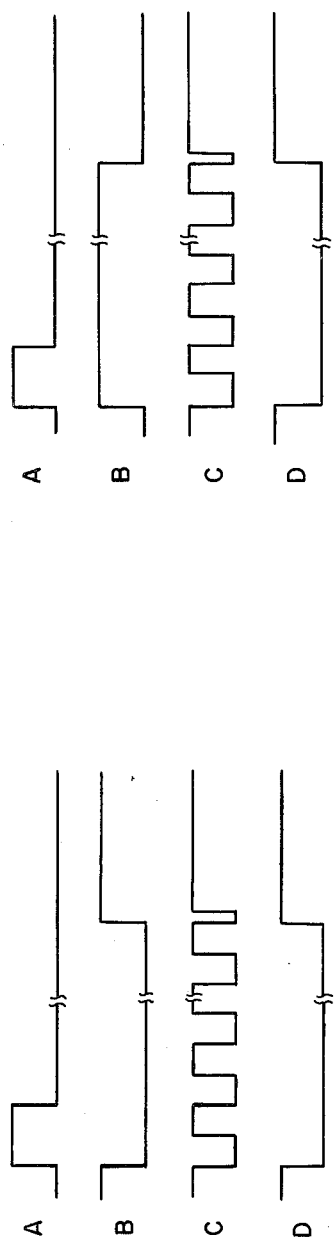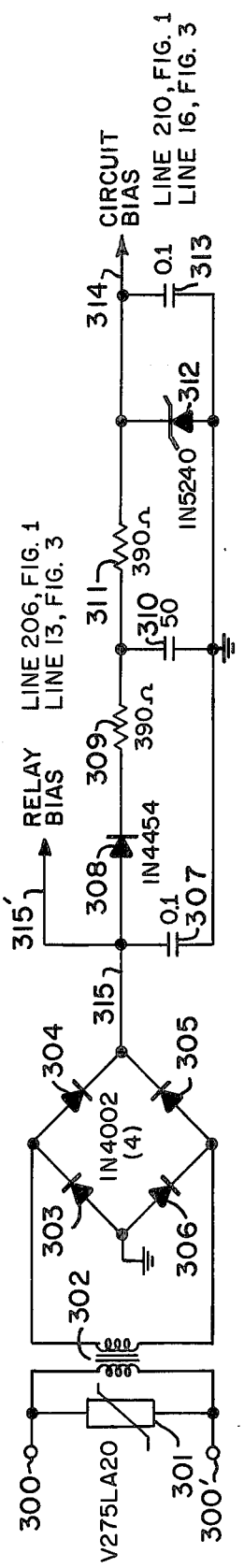

REMOTE LOAD CONTROLLER

BACKGROUND OF THE INVENTION

This invention relates in general to remote controlled switching of an electric load and more particularly concerns novel apparatus and techniques for disconnecting a load from operative connection with a power circuit in response to a remotely or locally generated disconnect control signal, and reconnecting the load to the power circuit either after a particular time delay or in response to a connect control signal.

The apparatus of the invention may be used by a plurality of remote stations to switch their respective loads into and out of connection with a power distribution circuit in response to control signals generated by a remote central control station. The apparatus of the invention will operate to reduce load disconnect transients in the power circuit by responding to staggered load disconnect signals to vary the time of disconnection of the various system loads and will reduce load connect transients by varying the automatic reconnect time delays of the various stations.

During particularly hot or cold days of the year, electric utilities typically operate at or near their maximum generating capacity since more generating capacity is required to serve the increased consumer load. However, instead of installing new generating capacity to meet peak consumer loads, some of the nonessential or interruptable load could be temporarily disconnected from the power system to reduce the power generating requirement of the system. Thus, electric loads such as water heaters, air conditioners, pool heaters and pumps, water and irrigation pumps, and space heaters could be temporarily disconnected from the power mains without undue discomfort, damage or economic loss to the user of the load.

Such a load switching function could be locally performed if the user would disconnect the load by simply switching the equipment off-line. However, a vast amount of presently installed equipment either does not have readily accessible switching gear or does not have a person available at all times to operate such gear. In addition, the user may not wish to turn off the load.

Therefore, it may be desirable for the electric utility to exercise control over such equipment so they can keep the load within the bounds of their generating capacity or share the burden of load disconnection among all classes of customers. This system control could be accomplished by combining the apparatus of the invention with the system disclosed in a prior patent to Jagoda et al, U.S. Pat. No. 4,012,734, which is assigned to the assignee of the present invention.

In addition, it is noted that a remote load switching apparatus could be used to switch a load in response to local control, for example a home computer, to automatically and more efficiently regulate the periods of energization of electrical appliances.

Accordingly, it is an important object of this invention to provide improved methods and means for disconnecting a load from electrical service.

It is another object of the invention to achieve the preceding object in response to a remotely generated signal.

It is still a further object of the invention to achieve one or more of the preceding objects while automatically reconnecting the load some preset time later.

It is still a further object of the invention to achieve one or more of the preceding objects while avoiding large transients on the electric system that might cause instability.

It is still a further object of the invention to achieve one or more of the preceding objects with a capability of reconnecting the load in response to a remotely generated signal.

It is still a further object of the invention to achieve one or more of the preceding objects with apparatus that is highly reliable, relatively inexpensive to produce and relatively immune to damage or false operation caused by induced or power line noise at various remote terminals.

These and other objects of the invention will become apparent from a review of the detailed specification which follows and a consideration of the accompanying drawings.

SUMMARY OF THE INVENTION

In order to achieve the objects of the invention and to overcome the problems of the prior art, the load controller apparatus, according to the invention, includes means to disconnect an electrical load from a load circuit in response to a first control signal, and means adapted to reconnect the load to the load circuit after a particular time delay or in response to a second control signal.

More particularly, an embodiment of the invention includes a memory means, for example a flip-flop, to receive the control signals and to generate a cycle control signal for activating and deactivating an oscillator and for enabling and disabling a solid-state switch. When the switch is enabled, it energizes a relay to disconnect the load from the load circuit, and when the switch is disabled it connects the load to the load circuit.

In response to a disconnect signal the flip-flop generates a start cycle signal to activate the oscillator and to enable the solid-state switch to energize the relay and disconnect the load. The disconnect signal also sets a counter to an initial count state and the counter receives pulses from the oscillator to count to a particular incremented count state. The counter generates a time-out signal when it counts to its incremented count state and the time-out signal is applied to reset the flip-flop and to thereby generate a stop cycle signal.

The stop cycle signal deactivates the oscillator and disables the solid state switch, thereby de-energizing the relay and connecting the load to the load circuit. Thus, the disconnect signal causes the load to be disconnected from the load circuit and the load is then reconnected to the load circuit after a time delay that is defined by the incremented count state of the counter.

The flip-flop may also be reset to generate the stop cycle signal in response to a connect signal.

The time delay between the application of a disconnect signal and the reconnection of the load to the load circuit may be extended by applying successive disconnect signals to successively set the counter to its initial count state before the counter counts to its incremented count state and generates a time-out signal.

Another embodiment of the invention employs separate oscillator control and memory control counters and a series coupled oscillator switch control and memory switch control to ensure that the load is connected to the load circuit despite single component failures in the apparatus of the invention.

In accordance with this embodiment of the invention, the load may be disconnected from the load circuit only if both the memory switch control and oscillator switch control are enabled. The oscillator switch control is enabled by the generation of pulses from the activated oscillator and the memory switch control is enabled by a start cycle signal from the flip-flop.

The memory control counter controls the timed generation of a time-out signal and the associated stop cycle signal as explained above. The oscillator control counter generates a timed disable signal to deactivate the oscillator at a particular time delay after the counter senses the leading edge or AC transition of the disconnect signal.

Therefore, the oscillator will be deactivated and the load will be connected to the load circuit even if the flip-flop fails to generate a stop cycle signal due to a malfunction of the memory control counter or the flip-flop, or due to a disconnect signal lead being held in an activate condition.

The load controlling apparatus of the invention may be included in remote load switching stations in a power distribution system controlled by a central station. In such a system, the central station may generate a load disconnect signal that will cause the remote stations in the system to disconnect their loads from electrical service at substantially the same time. In accordance with the operation of an embodiment of the invention, each remote station will then reconnect its load to electrical service after a time delay defined by the operational values of the electrical components included in its oscillator circuit.

However, since such components have tolerance variations, the time-delay switching cycle will not be the same for every station. Thus, load connect transients will be minimized since the stations will not reconnect their loads to electrical service at the same time.

BRIEF DESCRIPTION OF THE DRAWINGS

FIG. 1 is a circuit diagram illustrating a load controller with a single counter and a solid-state switch;

FIG. 2 is a waveform diagram illustrating the time relationship between various waveforms of the circuit shown in FIG. 1;

FIG. 4 is a waveform diagram illustrating the time relationship between various waveforms of the circuit shown in FIG. 3;

FIG. 5 is a power supply suitable for use with either of the circuits shown in FIGS. 1 and 3; and FIG. 6 is a block diagram of a system in accord with an embodiment of the invention.

DETAILED DESCRIPTION OF PREFERRED EMBODIMENTS

Figure 3:
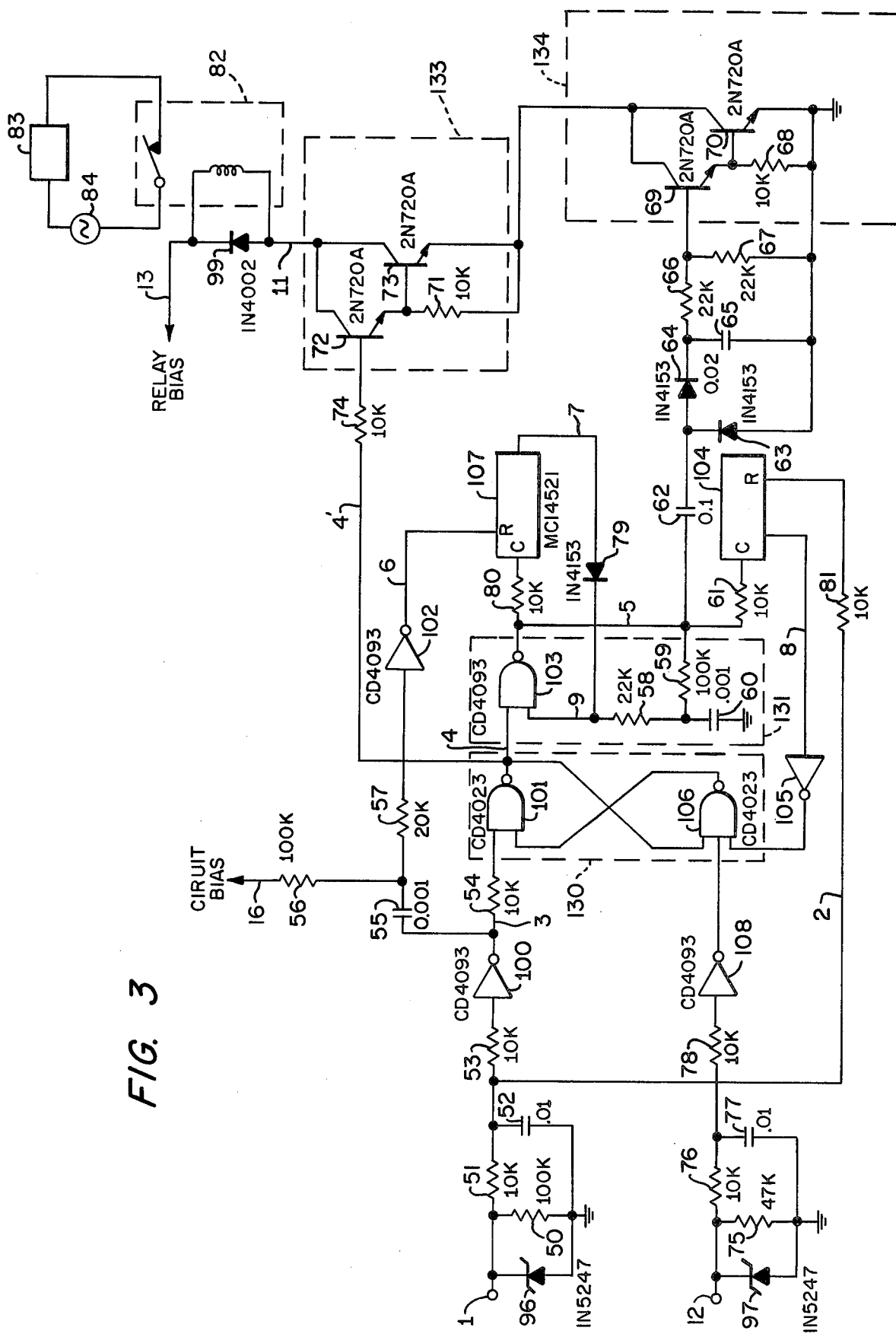
FIG. 3 is a circuit diagram illustrating a load controller with multiple counters and solid state switches for protection against single component failure.

With reference now to the drawings and more particularly FIG. 1 thereof, there is shown a circuit diagram of an exemplary embodiment of a remote load controller according to the invention. A line 201 is adapted to receive a disconnect signal and is terminated by a resistor 251, and filtered by a resistor 252 and a capacitor 253 to prevent false circuit action due to low level noise. A diode 250 prevents circuit damage due to very large signals or noise on the line 201. A resistor 254 prevents damage to a NOR gate 220 that might occur if the capacitor 253 were to discharge into it directly. Resistors 256, 257 and 259, capacitor 258, NOR gate 221, and diode 255 perform similar functions in regard to a line 209 that is adapted to receive a connect signal.

NOR gates 220 and 221, comprise a set-reset flip-flop 210. An input disconnect signal on the line 201, FIG. 2A, sets the flip-flop 210 so that its output, line 202 and FIG. 2B, goes to the logic 0 state. A counter 224 is also reset, via the line 208, so that its output, line 204 and FIG. 2D, goes to the logic 0 state. When the line 202 goes to the logic 0 state, it permits a gated oscillator 211 to start oscillating and a switch 212 to start conducting, thereby energizing the coil of a relay 213. When the coil of the relay 213, for example a Midtex 301-15B1A1, is energized the relay contacts are opened, thereby disconnecting the power source 281 from the load 282 and de-energizing the load 282.

The gated oscillator 211 is comprised of a NOR gate 222 and an inverter 223, resistors 261 and 262, and a capacitor 263. The operation of the oscillator 211 is described in RCA, Solid State Division, Application Note ICAN-6267. A counter 224 accumulates counts in accordance with the gated oscillator signal on the line 203, FIG. 2C. When the output of the oscillator line 204 goes to the logic 1 state, the flip-flop 210 is reset through a diode 260. At this time, the resistor 259 provides buffering so that the capacitor 258 does not overload the output of the counter 224.

When the flip-flop 210 is reset, the gated oscillator 211 is disabled and a switch 212 is made non-conducting by means of the line 202, thereby de-energizing the coil of the relay 213. Since the relay 213 is normally closed, de-energizing the relay causes the contacts to close and provides a continuous electrical path between the power source 281 and the load 282, thereby energizing the load.

Thus, the timing cycle that started with the signal on the line 201 is completed. The period of the timing cycle is determined primarily by the values of the resistor 262 and the capacitor 263. The values shown will provide a time cycle period of approximately 15 minutes. It should be appreciated that other time cycle periods can be obtained by those skilled in the art if the component values are changed.

It is noted that production units including components with the same rated values will seldom have exactly the same timing cycle period due to normal variations in component value. This is important in electric utility consumer load control applications where it is desired to de-energize many loads at the same time and to energize the loads at some nominal later time, but not at exactly the same instant. Moreover, although FIG. 1 shows suggested component values for a preferred embodiment of the invention, the invention is not necessarily limited to the component values shown.

The timing cycle can also be completed by a connect signal on the line 209 that is similar in amplitude and shape to that shown for the line 201, FIG. 2A. The signal on the line 209 will reset the flip-flop 210, thereby disabling the gated oscillator 211 and making the switch 212 nonconducting. At this time, the output of the counter 224, line 204, is a logic 0 and therefore the diode 260 will be reverse biased by the signal on the line 209. Thus, the diode 260 will have little or no effect on the input signal to the NOR gate 221.

In the event that signals are simultaneously applied on lines 201 and 209, it is desirable that the load controller be left in a known operating state. While these signals are both present, the inputs to the NOR gates 220 and 221 are both logic 1 and their outputs are both logic 0. When the signals on the lines 201 and 209 are removed, the capacitor 253 will discharge through the resistors 251 and 252 with a time constant equal to C253 (R251+R252) and the capacitor 258 will discharge through the resistors 256 and 257 with a time constant equal to C258 (R256+R257). Since the resistor 256 has a lower value than the resistor 251, the capacitor 258 will discharge to a logic 0 NOR gate input threshold voltage before the capacitor 253, and the load 282 will be de-energized for the timing cycle.

While the load is de-energized, the period of load de-energization can be extended by a disconnect signal on the line 201. This signal resets the counter 224, thereby erasing the count signals previously accumulated from the oscillator 211 and restarting the timing cycle. It should be appreciated that the timing cycle can be extended to obtain any desired load de-energization period in excess of a single timing cycle by applying successive disconnect signals on line 201 before the end of a current timing cycle.

The switch 212 is controlled by the signal on the line 202 through the resistor 264 which prevents overloading of the output of the flip-flop 210. The switch is comprised of a transistor 265 and a silicon controlled rectifier 267. When the signal on the line 202 is a logic 1, the transistor 265 saturates and clamps the gate of an SCR 267 to ground through a low impedance. Since the clamped SCR 267 can not conduct, the coil of the relay 213 is de-energized.

When the line 202 goes to the logic 0 state, the transistor 265 is switched off and the SCR gate is biased on, through the line 207 and the resistor 266. The resistor 266 acts as the collector load for the transistor 265 and the gate current limiting resistance for the SCR 267, thereby allowing the SCR to conduct and energize the coil of the relay 213. The diode 280 clips the voltage spike that would otherwise be present at the anode of the SCR 267 when the SCR stops conducting and the relay coil is de-energized.

It is noted that the switch circuit is biased by means of the line 210 and the relay is biased through the line 206. In addition, status signals for monitoring the operation of the circuit may be obtained from lines 202 and 207 and the anode of the SCR 267, although other operational signals could also be monitored.

FIG. 3 shows the circuit diagram of another exemplary embodiment of the invention. This embodiment is highly resistant to single component failures that would leave the load disconnected from the energy source. Line 1 is adapted to receive the disconnect signal and is terminated by a resistor 50 and filtered by a resistor 51 and a capacitor 52 to prevent false circuit action due to low level noise. A diode 96 prevents circuit damage due to very large signals or noise on line 1 and a resistor 53 prevents damage to an inverter 100 in the event that the capacitor 52 discharges directly into the inverter 100. Resistors 75, 76 and 78, capacitor 77, inverter 108 and diode 97 perform similar functions in regard to a line 12 that receives the connect signal.

Inverters 100 and 108 provide Schmidt trigger characteristics for added protection against false circuit action due to noise. NAND gates 101 and 106 comprise a set-reset flip-flop 130. An input disconnect signal on line 1, FIG. 4a, sets the flip-flop 130 through the inverter 100 so that the flip-flop output, line 4 and FIG. 4B, goes to the logic 1 state. The signal on line 1 also resets a memory control counter 104 by means of a line 2 and a resistor 81 so that the output of the counter, line 8 and FIG. 4D, goes to the logic 0 state. The resistor 81 protects the counter 104 against damage that might occur if the capacitor 52 discharges directly into the counter. A resistor 54 performs a similar function to protect a NAND gate 101 form the discharge of a capacitor 55.

When line 4 goes to the logic 1 state, it permits a gated oscillator 131 to start oscillating and, through line 4', a memory switch control 133 to start conducting. The gated oscillator output, line 5 and FIG. 4C, is AC coupled to a rectifying diode 64 by a capacitor 62. A diode 63 acts as a DC restoration clamp. The rectifier output is filtered by a capacitor 65 that provides a DC turn-on signal to an oscillator switch control 134 through a resistor 66, to cause the switch control 134 to start conducting. When the switch controls 133 and 134 are conducting, the coil of a relay 82, for example a Midtex 301-15B1A1, is energized and the relay contacts are thereby opened. The opening of the contacts disconnects the power source 84 from the load 83 and de-energizes the load 83.

The gated oscillator 131 is comprised of a NAND gate 103, resistors 58 and 59, and a capacitor 60. The operation of the oscillator is described in RCA, Solid State Division, File No. 836, CD4093B data sheet, at FIG. 19. The memory control counter 104 counts in response to the gated oscillator signals on line 5 through the resistor 61. When the counter 104 counts to a particular incremented count state, the output at line 8 goes to a logic 1 and the flip-flop 130 is reset through an inverter 105.

Resetting the flip-flop 130 forces line 4 and 4' to a logic 0 state, and thereby turns off the memory switch control 133 and disables the oscillator 131. Since the oscillator switch control 134 is AC coupled to the gated oscillator output and since the oscillator has ceased to operate, the capacitor 65 is discharged through the resistors 66 and 67 and the switch control 134 also stops conducting.

When either switch control 133 or 134 stops conducting, the coil of the relay 82 is de-energized and, since the relay 82 is normally closed, the relay contacts close to provide an electrical path between the power source 84 and the load 83, thereby energizing the load. A diode 99 clips the voltage spike that would otherwise be present at line 11 when either switch control 133 or 134 stops conducting.

This completes the timing cycle that started with the signal on line 1. The period of the timing signal is determined primarily by the values of the resistor 59 and the capacitor 60. The component values shown will provide a time cycle period of approximately 15 minutes. Other time cycle periods can be obtained by those skilled in the art by changing the component values. It is noted that production units of the same type will very seldom have exactly the same timing cycle period due to the normal variation in component value. As explained previously, this is important in electric utility load control systems. Moreover, although FIG. 3 shows suggested component values for a preferred embodiment of the invention, the invention is not limited to the component values shown.

The timing cycle can also be completed by a connect signal on the line 12 that is similar in amplitude and shape to that shown for line 1, FIG. 4A. The signal on line 12 will reset the flip-flop 130 through the inverter 108, thereby disabling the gated oscillator 131 and forcing the switch controls 133 and 134 to stop conducting. An oscillator control counter 107 may also be used to complete the timing cycle.

In operation, an input signal on line 1 will cause the counter 107 to be reset through a capacitor 55, a resistor 57 and an inverter 102 to an initial count state.

Resetting the counter 107 forces the output line 7 to go to the logic 0 state. The counter 107 then receives pulses from the oscillator 131 through the resistor 80 and when the counter counts to a particular incremented count state, the output line 7 goes to a logic 1 state and clamps the gated oscillator feedback input line 9 to the logic 1 state through a diode 79. The signal on line 9 disables the oscillator 131 and the oscillator ceases to generate oscillation pulses. Since the output of the gated oscillator is AC coupled to the switch control 134, the switch control 134 stops conducting when the oscillator stops pulsing and the relay 82 is thereby de-energized to close the relay contacts and connect the load 83 and the source 84.

Following the disable by the counter 107, the flip-flop 130 may be reset by a signal on the line 12 or the timing cycle may be restarted by a disconnect signal on line 1 which resets the counters 107 and 104 and starts the timing cycles of the counters again. It is noted that the reset signal to the counter 107 is AC coupled from line 3 by the capacitor 55 and the resistor 56 is connected to a logic 1 voltage, so that the reset input of the counter 107, line 6, is normally disabled. Thus, the counter 107 will be set to an initial counting state only by the transition of the signal on line 3 from a high to a low. In addition, the resistor 57 is used to protect the inverter 102 from damage when the capacitor 55 discharges.

In the event of simultaneous signals on lines 1 and 12 it is desirable to leave the load controller in a known operating state. Thus, when signals are present on lines 1 and 12, the inputs to the NAND gates 101 and 106 are both logic 0 and their inputs are both logic 1. When the signals on lines 1 and 12 are removed, the capacitor 52 will discharge through the resistors 50 and 51 with a time constant equal to C52 (R50+R51), and the capacitor 77 will discharge through the resistors 75 and 76 with a time constant equal to C77 (R75+R76). Since the resistor 75 has a lower value than the resistor 50, the capacitor 77 will discharge to a logic 0 inverter input threshold before the capacitor 52. Therefore, the load 83 will be de-energized for the timing cycle.

When the load is de-energized, the period of load de-energization can be extended by a signal on line 1. This signal resets the counters 104 and 107 and thereby erases the previously accumulated count signals from the oscillator 131. Thus, a new timing cycle is restarted before the previous timing cycle has run its course and the period of de-energization of the load is thereby extended. It should be appreciated that the de-energization period may be extended to any length by applying successive signals on line 1 to reset the counters 104 and 107 before they can generate either of their respective time-out signals to cause the energizing of the load.

The memory switch control 133 is comprised of transistors 72 and 73, and a resistor 71 connected in the Darlington configuration for high input to output current gain. A resistor 74 limits the current loading of the switch control 133 on the output of the flip-flop 130, line 4'. The oscillator control switch 134 is comprised of transistors 69 and 70 and a resistor 68, the components are similarly connected in the Darlington configuration to obtain high input to output current gain. It is noted that the circuit is biased by line 16 while the relay bias is provided by line 13. In addition, status signals for monitoring the operation of the circuit may be obtained from lines 11 and 5, although other operational signals could also be monitored.

It is important that the energy path to the load should always be able to be restored. The circuit shown in FIG. 3 incorporates features that permit this to be accomplished under conditions of a single component failing to perform in its normal manner. For example, if the signal on line 1 stays at the logic 1 level, the output of the flip-flop 130, lines 4 and 4', will stay at the logic 1 level, the switch control 133 will be maintained in the conducting state, and the output of the counter 104 will remain at logic 0 since its reset input at line 2 will be continuously reset.

However, since the reset input of the counter 107 is AC coupled through the capacitor 55, the counter 107 will be reset on the leading edge or AC transition of the signal applied at 1 and the counter 107 will thereafter count to a particular incremented count state and then generate an oscillator disable signal at its output, line 7, which will disable the oscillator 131 through the diode 79 and line 9. The disabled oscillator will cease to generate pulses on line 5 and the oscillator switch control 134 will stop conducting since it is AC coupled through the capacitor 62. Thus, the coil of the relay 82 will be de-energized, the relay contacts will close, and the load 83 will be connected to the source 84. Similarly, if the counter 104 fails to operate properly and its output fails to reset the flip-flop 130 through line 8 and the invertor 105, the counter 107 will again operate to connect the load 83 to the source 84.

The same restoration means will apply if the NAND gates 101 or 106, or the inverter 105 fails to operate properly. Also, the gated oscillator 131 can fail to have an oscillating output signal on line 5 and the switch control 134 will cease conducting, thereby de-energizing the relay 82 and connecting the load to the source. In addition, a short circuit at the input of either counter will have no effect on the operation of the remaining counter since the resistors 80 and 61 prevent overloads on the gated oscillator output, line 5, and thereby permit the remaining counter to function properly.

If the gated oscillator 131 fails to turn off in response to signals on line 4 or line 9, the output of the flip-flop 130, line 4', will place the switch control 133 in the nonconducting state, and will thereby connect the source and the load. Since the switch controls 133 and 134 are connected in series, either switch can remain in the conducting state and the other switch will control the relay coil. Similarly, the control circuitry of either switch can fail and the other switch will control the relay coil. In addition, the relay coil can open-circuit and the relay contacts will close to connect the source and load, since the relay is normally closed. Also, if the relay coil terminals are short-circuited, the coil can not be energized and the contacts will again be closed. Other reliability features will be evident to those skilled in the art.

The power supply for the circuits of FIGS. 1 and 3 is shown in FIG. 5. Lines 300 and 300' connect to the power mains. The power main voltage, typically 120, 208, 240, or 480 volts, is stepped down to 24 volts by a transformer 302 and rectified by diodes 303, 304, 305 and 306. The full wave rectified voltage on line 315' is the energy source for the relay coil and connects to line 206 of FIG. 1 or line 13 of FIG. 3. While a capacitor 306 provides some noise filtering, it is necessary that the voltage on line 315' go near ground periodically so that SCR 267 of FIG. 1 will stop conducting when its gate is clamped to ground by a transistor 265.

The circuit of FIG. 3 does not require the voltage on line 315' to act in this manner, but will perform correctly under this condition. Furthermore, this eliminates the need for a costly, high value of capacitance to act as a filter between line 315 and ground. A resistor 309 and a capacitor 310 filter the voltage on line 315 to obtain a DC voltage with only a mild ripple. This DC voltage is regulated and the ripple is eliminated by a zener diode 312. The regulated voltage on line 314 serves as the circuit bias voltage line 210 of FIG. 1 and line 16 of FIG. 3. A diode 308 prevents the capacitor 310 from discharging into line 315' and the resistor 309 limits the current through the diode 312. A capacitor 313 filters any noise or low level ripple on line 314 and a varistor 310 prevents circuit damage due to high amplitude spikes on the power mains 300 and 300'.

FIG. 6 shows a block diagram illustrating the arrangement of a remote load power switching system according to the invention. A central station 401 having a source of disconnect and connect signals provides signals over a communications link 402 to remote stations 403A . . . 403N, each remote station including circuitry such as shown in FIG. 1 or 3 and FIG. 5.

It is noted that the specific means for communicating between the central station and remote station is not a part of this invention and preferably comprises the ASEP ™ system commercially available from American Science & Engineering, Inc., substantially as described in the U.S. Pat. No. 4,012,734. That system is a two-way system that establishes communication over power lines to each remote station with each remote station having a transponder for transmitting information back to the central station. The present invention is useful in other kinds of systems, including one-way systems in which transmission may occur by radio, telephone lines or in a ripple system over the power lines.

While from a practical standpoint it is more important to avoid severe loading transients which occur when a heavy load is connected to the power service, the principles of the invention are applicable to lessening unloading transients which occur when loads are shedded from the line. Thus, circuitry of the type used to restore the load after furnishing an imprecise delay following disconnection may be introduced before the input 201 of FIG. 1 or the input 1 of FIG. 3, with significantly shorter delays, to reduce the unloading transient which occurs when the system commands all remote stations to shed a particular type of load. Alternatively, the central station may command disconnection of the different remote stations sequentially instead of simultaneously.

It should be appreciated that the remote load controller embodiments of the invention are not limited to operation with a particular source of disconnect and connect load control signals. For example, as indicated above, the load controller is well adapted to operate at remote station locations to switch loads in a power distribution system in response to control signals initiated by a remote central control station.

Likewise, the controller may be used to respond to control signals generated by a home computer to automatically regulate the periods of energization of electrical appliances and to thereby utilize the appliances more efficiently. It will be apparent to those skilled in the art that such a computer can be programmed to automatically generate particular connect control signals at specified times. Of course, the apparatus of the invention is well adapted to respond to such computer generated disconnect signals to de-energize particular electrical devices and to energize the devices after a disconnect time delay or in response to a computer generated connect signal.

In addition, the load controller is adapted to respond to manual switch control signals so that a user can manually operate the controller to energize or de-energize electrical appliances.

Moreover, it should be understood that the invention is not limited to a particular mode of switching in response to switching control signals. For example, the invention includes embodiments wherein a load is connected to a circuit in response to a remote connect signal and is disconnected from the circuit in response to a disconnect signal or after a disconnect time delay.

There has been described novel apparatus and techniques for controlling loads connected to electric power mains with numerous advantages and features described above. It is apparent that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and is limited solely by the spirit and scope of the appended claims.

What is claimed is:

1. A load controller apparatus for switching at least one electrical load into and out of operative electrical connection with a load circuit, said apparatus comprising:

memory means for generating a stop cycle control signal in response to a memory time-out signal and for generating a start cycle control signal in response to at least a first load control signal, said memory means including means for generating a stop cycle control signal in response to a second load control signal;

cycle timing means for generating said time-out signal at a particular time delay after the initiation of a start cycle control signal by said first load control signal, and applying said time-out signal to said memory means to generate a stop cycle control signal;

switch means responsive to said start cycle control signal to switch said load to a first switch position in relation to said load circuit and responsive to said stop cycle control signal to switch said load to a second switch position; and input error correction means for operating said memory means to generate a particular cycle control signal in response to simultaneously applied first and second load control signals.

2. The apparatus of claim 1 including means for monitoring operational signals of said load controller to determine the state of connection of said load and the operational condition of said controller.

3. The apparatus of claim 1 wherein said cycle timing means is adapted to generate a time-out signal at an extended time delay after the application of a particular first load control signal, said extended time delay being defined by the number of additional first load control signals that are applied to said cycle timing means to initiate successive new timing cycles before a time-out signal is generated.

4. The apparatus of claim 1 wherein said first and second load control signals are generated by a central control station.

5. The apparatus of claim 1 wherein said cycle timing means includes:

oscillator means adapted to generate a stream of electrical pulses at a particular frequency when activated by a start cycle control signal and to cease the generation of said pulses when deactivated by a stop cycle control signal, and control counter means adapted to be set to a particular initial count state by a first load control signal and to thereafter increment in response to oscillator pulses to generate a time-out signal after a delay time defined by a particular incremented count state.

6. The apparatus of claim 5 including means for monitoring operational signals of said load controller to determine the state of connection of said load and the operational condition of said controller.

7. The apparatus of claim 5 wherein said control counter means is adapted to generate a time-out signal at an extended time delay after said control counter is set to a particular initial count state, the extended time delay being defined by the number of successive resettings of said counter before the counter is allowed to count to said particular incremented count state.

8. The apparatus of claim 5 wherein said memory means is adapted to generate a stop cycle control signal in response to a second load control signal.

9. The apparatus of claim 5 wherein said switch means includes a relay with normally closed switch contacts, the de-energization of said relay closing said contacts to switch said load to the second switch position to provide an operative electrical connection between the load and the load circuit, and the energization of said relay opening said contacts to switch said load to the first switch position to disconnect the load and the load circuit.

10. The apparatus of claim 1 wherein said input error correction means operates said memory means to generate a start cycle control signal in response to simultaneously applied first and second load control signals.

11. A load controller apparatus for switching at least one electrical load into and out of operative electrical connection with a load circuit and for maintaining said load in operative connection with said load circuit despite single component failures in the apparatus, said load controller apparatus comprising:

memory means for generating a stop cycle control signal in response to at least a memory time-out signal and for generating a start cycle control signal in response to at least a first load control signal;

oscillator means adapted to generate a stream of electrical pulses at a particular frequency when enabled by an oscillator enable signal and activated by a start cycle control signal, and to cease generating said pulses in response to a stop cycle control signal and in response to an oscillator disable signal;

a memory control counter for generating a memory time-out signal at a particular memory time delay after a first load control signal is applied to said counter, and applying the memory time-out signal to said memory means to generate a stop cycle control signal;

an oscillator control counter responsive to the AC leading edge transition of a first load control signal to generate an oscillator enable signal to enable the generation of said oscillator pulses and adapted to generate an oscillator disable signal to stop the generation of said oscillator pulses at a particular oscillator time delay after the AC leading edge transition of the first load control signal;

an oscillator switch control for enabling said load to be switched to a first switch position when said oscillator is generating pulses and for switching said load to a second switch position and maintaining the load in said second switch position when said oscillator stops generating pulses;

a memory switch control cooperating with said oscillator switch control to switch said load to a first switch position when said oscillator is generating pulses and a start cycle control signal is generated, and for switching said load to said second switch position and maintaining said load in said second switch position when said stop cycle control signal is generated; and load switching means adapted to respond to the cooperating memory switch control and oscillator switch control to connect and disconnect said load from said load circuit.

12. The load controller of claim 11 wherein said memory control counter is adapted to be set to a particular initial count state by a first load control signal and to thereafter receive said pulses from said oscillator to increment said memory counter and to generate a memory time-out signal after a memory counter time delay defined by a particular incremented count state of said memory counter.

13. The load controller of claim 12 wherein said memory control counter is adapted to generate a memory timeout signal at an extended time delay after said control counter is set to a particular initial count state, the extended time delay being defined by the number of successive resettings of said counter before the counter is allowed to count to said particular incremented count state and generate a memory time-out signal.

14. The load controller of claim 11 wherein said oscillator control counter is adapted to be set to a particular initial count stage by the AC leading edge transition of a first load control signal and to thereafter receive said pulses from said oscillator to increment said oscillator control counter and to generate an oscillator disable signal to stop the generation of said pulses after an oscillator counter time delay defined by a particular incremented count state of said oscillator counter.

15. The load controller of claim 14 wherein said oscillator control counter is adapted to generate an oscillator disable signal at an extended time delay after said oscillator counter is set to a particular initial count state, the extended time delay being defined by the number of successive resettings of said oscillator counter before the counter is allowed to count to said particular incremented count state and generate an oscillator disable signal.

16. The load controller of claim 11 including means for monitoring operational signals of said load controller to determine the state of connection of said load and the operational condition of said controller.

17. The load controller of claim 11 wherein said memory means is adapted to generate a stop cycle control signal in response to a second load control signal.

18. The load controller of claim 17 including input error correction means for operating said memory means to generate a particular cycle control signal in response to simultaneously applied first and second load control signals.

19. The load controller of claim 18 wherein said input error correction means operates said memory means to generate a start cycle control signal in response to simultaneously applied first and second load control signals.

20. The load controller of claim 11 wherein said load switching means includes a relay with normally closed switch contacts, said relay being adapted to close said contacts when de-energized to switch said load to the second switch position to provide an operative electrical connection between the load and the load circuit, and to open said contacts when energized to switch said load to the first switch position to disconnect the load and the load circuit.

21. The load controller of claim 20 wherein said memory switch control is adapted to turn on to conduct current in response to a start cycle control signal and to turn off to block the flow of current in response to a stop cycle control signal.

22. The load controller of claim 21 wherein said oscillator switch control is adapted to turn on to conduct current when said oscillator is generating pulses and to turn off to block the flow of current when said oscillator stops generating pulses.

23. The load controller of claim 22 wherein said oscillator switch control and said memory switch control are connected in series and current in conducted to energize said relay only when said oscillator switch control and said memory switch control are turned on.

24. The load controller of claim 11 wherein said oscillator control counter is adapted to turn off said oscillator to switch said load to said second switch position to operatively connect the load with the load circuit when said memory means fails to generate a stop cycle control signal due to a component failure in the load controller.

25. The load controller of claim 11 wherein said oscillator switch control is adapted to maintain said load in said second switch position to operatively connect the load and the load circuit if a fault in said load controller prevents said oscillator from generating said electrical pulses.

* * * * *